United States Patent
Cole et al.

(10) Patent No.: US 9,341,098 B2
(45) Date of Patent: May 17, 2016

(54) AUTOMOTIVE CATALYTIC AFTERTREATMENT SYSTEM

(71) Applicant: JOHNSON MATTHEY PUBLIC LIMITED COMPANY, London (GB)

(72) Inventors: Kieran Cole, Royston (GB); Colin Newman, Royston (GB); Isabel Tingay, Royston (GB); Olivier Sonntag, Royston (GB); Gudmund Smedler, Royston (GB); Ruth Savage, Royston (GB)

(73) Assignee: Johnson Matthey PLC, London (GB)

( * ) Notice: Subject to any disclaimer, the term of this patent is extended or adjusted under 35 U.S.C. 154(b) by 395 days.

(21) Appl. No.: 13/713,349

(22) Filed: Dec. 13, 2012

(65) Prior Publication Data

US 2013/0152548 A1   Jun. 20, 2013

(30) Foreign Application Priority Data

Dec. 14, 2011   (GB) .................................. 1121468.1

(51) Int. Cl.
*F01N 3/10* (2006.01)
*F01N 3/20* (2006.01)
(Continued)

(52) U.S. Cl.
CPC ................ *F01N 3/20* (2013.01); *B01D 53/944* (2013.01); *B01D 53/9477* (2013.01); *B01J 23/44* (2013.01); *B01J 35/0006* (2013.01); *F01N 3/0231* (2013.01); *F01N 3/035* (2013.01); *F01N 3/103* (2013.01); *F01N 3/2066* (2013.01); *B01D 2255/1021* (2013.01);
(Continued)

(58) Field of Classification Search
CPC ....... F01N 3/2066; F01N 3/035; F01N 3/103; F01N 3/20; F01N 3/0231; B01J 35/0006; B01J 23/44; B01D 53/944; B01D 53/9477
USPC ........................................................... 60/299
See application file for complete search history.

(56) References Cited

U.S. PATENT DOCUMENTS

| 3,910,850 | A | 10/1975 | Turner |
| 4,329,162 | A | 5/1982 | Pitcher, Jr. |

(Continued)

FOREIGN PATENT DOCUMENTS

| EP | 0622107 A2 | 11/1994 |
| EP | 1640056 A2 | 11/2006 |

(Continued)

OTHER PUBLICATIONS

GB Search Report dated Apr. 18, 2012 for corresponding Application No. 1121468.1 filed Dec. 14, 2011.

(Continued)

*Primary Examiner* — Jason Shanske
(74) *Attorney, Agent, or Firm* — Gary D. Mangels

(57) ABSTRACT

A catalytic aftertreatment system for a diesel engine exhaust gas is described. The system comprises a diesel oxidation catalyst (DOC) and an aftertreatment device located downstream of the diesel oxidation catalyst (DOC), which aftertreatment device requires periodic heat treatment, and means to generate a temperature increase within the aftertreatment device, said diesel oxidation catalyst (DOC) comprising an upstream zone of length from 0.5 to 2 inches (12.7-50.81 mm) of higher oxidation activity for hydrocarbons (HC) than the remainder of the diesel oxidation catalyst (DOC).

10 Claims, 4 Drawing Sheets

(51) Int. Cl.
  B01J 35/00 (2006.01)
  B01J 23/44 (2006.01)
  B01D 53/94 (2006.01)
  F01N 3/023 (2006.01)
  F01N 3/035 (2006.01)
  B01J 37/02 (2006.01)
  B01J 35/04 (2006.01)

(52) U.S. Cl.
  CPC ............... *B01D 2255/1023* (2013.01); *B01D 2255/9032* (2013.01); *B01D 2255/9202* (2013.01); *B01D 2258/012* (2013.01); *B01J 35/04* (2013.01); *B01J 37/0228* (2013.01); *Y02T 10/24* (2013.01)

(56) References Cited

U.S. PATENT DOCUMENTS

| | | | |
|---|---|---|---|
| 4,519,820 | A | 5/1985 | Oyobe et al. |
| 4,849,274 | A | 7/1989 | Cornelison |
| 5,089,237 | A | 2/1992 | Schuster et al. |
| 5,330,720 | A | 7/1994 | Sorbo et al. |
| 6,171,556 | B1 | 1/2001 | Burk et al. |
| 7,398,644 | B2 | 7/2008 | Leone et al. |
| 7,779,624 | B2 | 8/2010 | Belisle et al. |
| 7,797,932 | B2 | 9/2010 | Herrick et al. |
| 7,926,263 | B2 | 4/2011 | Stroh et al. |
| 2006/0153761 | A1* | 7/2006 | Bandl-Konrad et al. .. 423/239.1 |
| 2008/0045405 | A1 | 2/2008 | Beutel et al. |
| 2009/0137386 | A1 | 5/2009 | Pfeifer et al. |
| 2009/0158719 | A1* | 6/2009 | Hallstrom et al. .............. 60/297 |
| 2009/0288402 | A1 | 11/2009 | Voss et al. |
| 2010/0095658 | A1 | 4/2010 | Spurk et al. |
| 2010/0166629 | A1 | 7/2010 | Deeba |
| 2010/0183490 | A1 | 7/2010 | Hoke et al. |
| 2011/0099975 | A1 | 5/2011 | Bailey et al. |
| 2011/0146236 | A1 | 6/2011 | Sun et al. |
| 2011/0206584 | A1 | 8/2011 | Dobson et al. |
| 2011/0212008 | A1 | 9/2011 | Punke et al. |
| 2015/0071839 | A1 | 3/2015 | Massner et al. |

FOREIGN PATENT DOCUMENTS

| | | |
|---|---|---|
| FR | 2937882 A1 | 5/2010 |
| GB | 2406803 A | 4/2005 |
| WO | 9743035 A1 | 11/1997 |
| WO | 9955459 A1 | 4/1999 |
| WO | 9947260 A1 | 9/1999 |
| WO | 0029726 A1 | 5/2000 |
| WO | 2007077462 A1 | 7/2007 |
| WO | 2009005910 A1 | 1/2009 |
| WO | 2011057649 A1 | 5/2011 |
| WO | 2011082357 A1 | 7/2011 |

OTHER PUBLICATIONS

PCT International Search Report dated Mar. 25, 2013 for corresponding International Application No. PCT/GB2012/053119 filed Dec. 13, 2012.

* cited by examiner

AUTOMOTIVE CATALYTIC AFTERTREATMENT SYSTEM

CROSS REFERENCE TO RELATED APPLICATIONS

This invention claims the priority benefit of Great Britain Patent Application No. 1121468.1, filed on 14 Dec. 2011, which is incorporated herein by reference.

FIELD OF THE INVENTION

The invention relates to a catalytic aftertreatment system, particularly for automotive use, such as for a diesel engine. More particularly, the invention concerns catalytic aftertreatment systems incorporating a diesel oxidation catalyst (DOC) and a regenerable aftertreatment device located downstream of the diesel oxidation catalyst (DOC). The invention further relates to a method of maintaining diesel oxidation catalyst (DOC) activity during active heat treatment of an aftertreatment device and to a method of avoiding extinction of a diesel oxidation catalyst (DOC) during an active heat treatment event.

BACKGROUND TO THE INVENTION

The ever-increasing regulation of emissions from vehicles has been met by a combination of engineering design, including sophisticated engine management, and a variety of catalytic aftertreatment devices.

In the case of exhaust gases from compression ignition (hereafter called "diesel") engines, the regulated emissions are carbon monoxide (CO), hydrocarbons (HC), nitrogen oxides (NOx) and particulates. Particulates, although often simply called "soot" are complex solids of which carbon particles form a major part. At one time, the emission of particulates was the characteristic "smoke" issued by diesel engines, particularly when operating under heavy load such as during hill climbing. The carbon particles also carry varying amounts of absorbed or adsorbed hydrocarbons and oxidation by-products.

A Diesel Oxidation Catalyst (DOC) was the first catalytic aftertreatment device introduced for light duty diesel vehicles. A DOC comprises a catalyst, almost exclusively based on a Platinum Group Metal (PGM), particularly platinum, optionally in combination with another PGM and/or a catalytic base metal, deposited on a high surface area flow-through catalyst substrate. A substrate unit is colloquially called a "brick". The DOC is effective to oxidise CO and HC, and to reduce the weight of particulates, and for some years a DOC was adequate to meet the regulations for light duty diesel emissions.

As higher standards for emission control from diesel vehicles were introduced, it became necessary to deal with particulates. Diesel engines generally produce a lower level of $NO_x$ than spark-ignition or gasoline engines, and diesel engines can be engineered to decrease particulates, although at the expense of an increase of $NO_x$, or vice versa.

Under the regulations current in Europe and being introduced in USA, state of the art diesel vehicles now have a combination of a DOC and a soot filter, and may have a $NO_x$ reducing system also. The soot filter is often, but not exclusively, a Catalysed Soot Filter (CSF), and although these may differ in detail, they generally incorporate a ceramic wall flow filter or, less frequently, a sintered metal filter. The catalysed filter carries a deposit of a soot oxidation catalyst, such as a PGM and an alkali metal or alkaline earth metal combination.

Such filters are capable of meeting the regulations for particulate emissions. Although during normal drive cycles involving a high speed section such filters are not plagued with accumulation of soot, real life scenarios, for example in cities, may include extended periods of low-speed driving and/or extended idling periods, during which soot can accumulate in the filter but the exhaust gas temperatures are insufficient for the catalytic oxidation of the soot. The blocking of either the face of the filter or accumulation of soot within the passageways in the filter, may be such as to cause an increase of back pressure to the extent that engine efficiency is badly affected, or in an extreme case the engine itself is damaged. It is therefore necessary to provide filter regeneration of some form to clear the filter.

Passive regeneration involves running the vehicle at a sufficiently high speed that the exhaust gases reach a temperature at which accumulated soot begins to oxidise.

The alternative of active regeneration is described for example in GB 2406803A. Fuel in the form of supplementary HC in the exhaust gas is supplied to the DOC, where it combusts and raises the temperature of the exhaust gases to the point where catalytic combustion of the accumulated soot is initiated on the catalytic soot filter. GB 2406803A (Johnson Matthey) concerning active regeneration discloses a DOC having a Pt-component in an upstream end of the brick with a Pd-component in the downstream end of the brick. The only other disclosure of dimensions states "The substantially Pd-free Pt containing zone can be up to half of the length of the substrate monolith or of a "stripe"-type dimension." It is to be noted that the purpose of the differing compositions arises from sulfation arising from sulphur-containing diesel fuels. Although in European countries current diesel fuels have low or ultra-low sulphur contents, there remain issues with the higher sulphur levels found in many other countries.

WO 00/29726 (Engelhard) describes in one embodiment a flow-through catalyst or DOC (confusingly described in some places as a second catalyst) upstream of a catalysed soot filter. The DOC is of uniform composition, but the CSF may have a 4 inch Pt-enriched end. In some tests, the DOC is tested together with the CSF, and in some experiments the CSF is used alone. In some of the CSF experiments, the Pt-enriched end is upstream, in some experiments the Pt-enriched end is downstream. This early CSF disclosure does not contemplate active regeneration of the CSF.

WO 2009/005910 (Cummins) describes an exhaust aftertreatment device in which the front face of a brick has a physical form or a chemical coating effective to prevent "blinding" or blockage or face-plugging of a brick exposed to a diesel particulate-containing exhaust gas stream. When a chemical coating is used, it is plainly stated that this is intended to be carried on the front face of the brick and does not extend into the fluid passageways of the brick.

WO 2007/077462 (Johnson Matthey) discloses a triple-zoned DOC, intended to improve upon the performance of a DOC having uniform composition or a DOC having a single zone of higher Pt loading at the upstream end of the brick. No active regeneration system is disclosed, so that there is no periodic enrichment of exhaust gas. Although the invention is intended to deal with a "lit-out" problem, that problem is created on cooler parts of the New European Drive Cycle. The inventors of WO 2007/077462 discovered that a uniform loading of PGM on the DOC, or a DOC with a relatively high loading on a front section, exhibit a tendency to light-out or extinguish. The solution advocated in WO 2007/077462 is to incorporate a third, higher loading, zone at the downstream end of the DOC. The problem dealt with is different from that of the present invention.

SUMMARY OF THE INVENTION

We have discovered that active regeneration of a filter in a DOC/filter combination system is still remarkably dependent upon exhaust gas temperature as it enters the DOC. This observation is particularly true when the DOC is already aged. That is, even when the DOC has "lit off", if the exhaust gas temperature is about 250° C., the DOC light off can still extinguish during an active regeneration event. This result is surprising considering that excess HC fuel is being supplied to the DOC for the purpose of raising the exhaust gas temperature to cause the soot filter catalyst to light off, and one would expect the DOC itself should remain operational in terms of light off. That this should be observed to occur at an exhaust gas temperature of 250° C., which is not uncommon in diesel engine exhausts, can present problems with managing regulated emissions.

The meaning of the term "light off" in vehicle catalytic aftertreatment is well-known in the art. Unless otherwise indicated, a catalyst is considered to light off at a temperature at which 50% (e.g. 50 wt %) of a component is catalytically converted.

Other devices positioned within an exhaust system may also require periodic regeneration or other heat treatment. For example, selective catalytic reduction (SCR) catalysts, such as those based upon a copper component, may require desulfation, and this may conveniently be done by a thermal treatment. Accordingly, the generation of an exotherm by supplying additional fuel into an exhaust system or into an exhaust gas is capable of regenerating a number of different exhaust gas aftertreatment devices.

It is therefore an aim of the present invention to provide systems and methods to improve the effectiveness of DOCs in an active regeneration system. An important part of the present invention is the provision of a DOC having a more active first zone than, for example, the remainder of the DOC.

The invention therefore provides a catalytic aftertreatment system for a diesel engine exhaust gas, said system comprising a diesel oxidation catalyst (DOC) and an aftertreatment device located downstream of the diesel oxidation catalyst (DOC), which aftertreatment device requires periodic heat treatment, and means to generate a temperature increase within the aftertreatment device, said diesel oxidation catalyst (DOC) comprising an upstream zone of length from 0.5 to 2 inches (12.7-50.81 mm) of higher oxidation activity for hydrocarbons (HC) than the remainder of the diesel oxidation catalyst (DOC).

Surprisingly, in view of WO 2007/077462, the diesel oxidation catalyst with such specific upstream zone dimensions, does not exhibit "lit out" performance in the region of interest, but rather maintains light off in contrast to a uniform composition or a zoned DOC having a smaller high activity "stripe", even when maintaining the same total PGM loading. Experimental results illustrating the surprising effects of the present invention are described in more detail below.

Conventional aftertreatment devices, such as regenerable devices, based on flow-through metal or ceramic substrates for exhaust gas catalysts and for exhaust gas filters are known in the art, and the present invention will be described with reference to such devices. The invention, however, should not be considered to be limited to such devices, and the use of more unusual flow-through catalyst substrates or filter constructions is included within the scope of the present invention.

The invention also provides a method of maintaining diesel oxidation catalyst (DOC) activity during active heat treatment of an aftertreatment device located downstream of the diesel oxidation catalyst (DOC) in a diesel engine exhaust gas aftertreatment system, at exhaust gas temperatures of 200 to 375° C., by passing the exhaust gas over a diesel oxidation catalyst (DOC) having or comprising an upstream zone of length from 0.5 to 2 inches (12.7 to 50.81 mm) of higher oxidation activity for hydrocarbons (HC) than the remainder of the diesel oxidation catalyst (DOC).

The invention further provides a method of avoiding extinction of a diesel oxidation catalyst (DOC) during an active heat treatment event for an aftertreatment device located downstream of the diesel oxidation catalyst (DOC), at an exhaust gas temperature of 200 to 375° C., by passing exhaust gas enriched with hydrocarbons (HC) over a diesel oxidation catalyst (DOC) having or comprising an upstream zone of length from 0.5 to 2 inches (12.7 to 50.81 mm) of higher oxidation activity for hydrocarbons (HC) than the remainder of the DOC.

A further aspect of the invention relates to a vehicle comprising a diesel engine and a catalytic aftertreatment system of the invention.

The invention further relates to the use of a zone in a diesel oxidation catalyst (DOC) to (a) maintain activity of the diesel oxidation catalyst (DOC) and/or (b) avoid extinction of the diesel oxidation catalyst (DOC), during active heat treatment of an aftertreatment device located downstream of the diesel oxidation catalyst (DOC), typically at an exhaust gas temperature of 200 to 375° C., by passing an exhaust gas enriched with hydrocarbons (HC) over the diesel oxidation catalyst (DOC), wherein the zone has a length of 0.5 to 2 inches (12.7-50.81 mm) and has a higher oxidation activity for hydrocarbons (HC) than the remainder of the diesel oxidation catalyst (DOC). Generally, the zone is upstream (i.e. at an upstream end) of the diesel oxidation catalyst.

A further aspect of the invention relates to the use of a diesel oxidation catalyst (DOC) to regenerate an aftertreatment device located downstream of the diesel oxidation catalyst (DOC), typically in a catalytic aftertreatment system for an exhaust gas of a diesel engine, wherein the diesel oxidation catalyst (DOC) comprises an upstream zone of length from 0.5 to 2 inches (12.7-50.81 mm) of higher oxidation activity for hydrocarbons (HC) than the remainder of the diesel oxidation catalyst (DOC). In general, the aftertreatment device requires periodic heat treatment. Typically, the invention further relates to the use of the diesel oxidation catalyst (DOC) to regenerate an aftertreatment device located downstream of the diesel oxidation catalyst (DOC) in combination with means to generate a temperature increase with the aftertreatment device.

BRIEF DESCRIPTION OF THE DRAWINGS

In order that the invention may be more fully understood, reference is made to the following Examples by way of illustration only and with reference to the accompanying drawings.

DETAILED DESCRIPTION OF THE INVENTION

Figure 1:
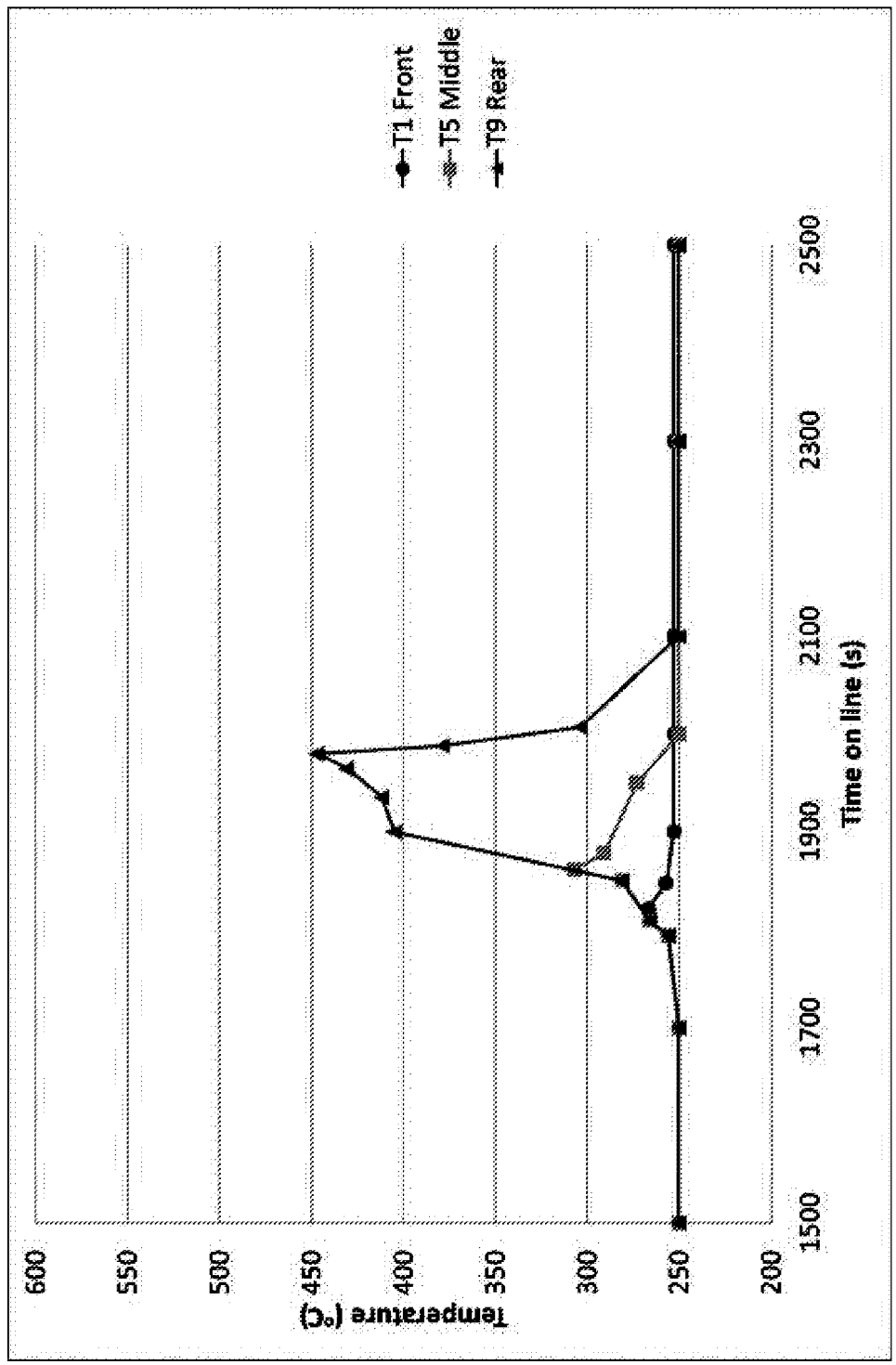
FIG. 1 is a graph showing the temperature at three regions inside a conventional diesel oxidation catalyst (DOC 1) when an exhaust gas is passed through it. DOC 1 has a uniform PGM loading.

In general, any reference to an exhaust gas as used herein typically refers to an exhaust gas from a diesel engine.

Typically, the temperature of the exhaust gas that is passed over the diesel oxidation catalyst (DOC) is 200 to 375° C. Thus, aspects of the invention relating to a use or a method may include a step of contacting an exhaust gas at a temperature of 200 to 375° C. with the diesel oxidation catalyst (DOC) or passing an exhaust gas at a temperature of 200 to 375° C. over or through the diesel oxidation catalyst (DOC).

The present invention relates to a diesel oxidation catalyst (DOC) having an upstream zone that has a higher oxidation activity for hydrocarbons (HC) than the remainder (e.g. downstream zone(s)) of the DOC. A zone having a higher reactivity toward hydrocarbons can generate an exotherm (i.e. heat) when the exhaust gas has a temperature below the "light-off" temperature of the remainder of the DOC. The heat generated can, for example, be transferred via the exhaust gas and through the substrate unit or brick to bring the remainder of the DOC up to its "light off" temperature. It can also maintain the remainder of the DOC at its light-off temperature when the temperature of the exhaust gas drops (e.g. when the engine is idling). The oxidation activities of the upstream zone and the remainder of the DOC toward hydrocarbons (HC) can be measured using any conventional technique known in the art.

The oxidation activity of the upstream zone and the remainder or downstream zone(s) of the DOC toward hydrocarbons (HC) is preferably measured as $T_{50}$ for hydrocarbons. Thus, the $T_{50}$ for hydrocarbons of the upstream zone is lower than the $T_{50}$ for hydrocarbons of the remainder or downstream zone(s) of the DOC. The $T_{50}$ is well-known in the art and represents the lowest temperature at which there is 50% conversion of a particular reactant, in this case hydrocarbons. The $T_{50}$ typically relates to 50% conversion of hydrocarbons in an exhaust gas from a diesel engine, such as a diesel engine run on a diesel fuel (e.g. B7) in accordance with the EN590:1993 standard, preferably a diesel fuel in accordance with EN590:1999, more preferably a diesel fuel in accordance with EN590:2004 or EN590:2009.

The upstream zone has a length of 0.5 to 2 inches (12.7 to 50.81 mm). It is preferred that the upstream zone has a length of 0.5 to 1.75 inches, such as 0.5 to 1.5 inches or 0.6 to 1.75 inches, more preferably 0.75 to 1.25 inches. Typically, the upstream zone has a length of about or approximately 1 inch (2.54 cm). The reference to length in the context of the upstream zone used herein refers to its mean length. As it is well known in the art, there may be some variation in the precise length of the zone depending on the method used for its manufacture. Normally, the length does not deviate by more than 10% from the mean, preferably not more than 5%, more preferably not more than 1%, from the mean value of the length. For the avoidance of doubt, the length of the upstream zone is generally measured parallel to a longitudinal axis of the DOC from its inlet end.

Typically, the DOC may have a diameter of from 2.5 to 15 inches, such as 4 to 15 inches, preferably 5 to 12.5 inches, such as 6 to 10 inches.

The length of the DOC (i.e. in total) is typically 2.5 to 15 inches, such as 3 to 12.5 inches, preferably 4 to 11 inches (e.g. 5 to 10 inches).

Generally, the dimensions of the DOC are conventional. For example, the DOC may have a diameter of 4 to 15 inches and a length of 2.5 to 10 inches. Any reference to length or diameter in the context of the DOC as used herein refers to a mean length or a mean diameter. Normally, the length or diameter does not deviate by more than 10% from the mean, preferably not more than 5%, more preferably not more than 1%, from the mean value of the length or diameter respectively.

Whilst the nature (i.e. length and/or oxidation activity) of the upstream zone is important, the remainder or the downstream zone(s) of the DOC can have a variety of compositions. Thus, for example, the remainder of the DOC can have a non-uniform composition (e.g. the remainder of the DOC may comprise a plurality of zones and/or layers, such as two or three zones or layers). However, because of the scarcity of PGMs and their consequent high price, there is a preference towards minimising the total quantity of PGM in the DOC. The present invention can provide improved DOC performance with no greater overall loading of PGM, and in certain circumstances it may be possible to employ lower total PGM loadings on the DOC.

The DOC generally comprises a catalyst composition supported on a substrate unit (e.g. a "brick"). The catalyst composition typically comprises at least one PGM, preferably at least two PGMs.

It is preferred that catalyst composition comprises at least one, more preferably at least two different, PGMs selected from the group consisting of platinum, palladium, rhodium and a mixture or alloy of two or more thereof. More preferably, the catalyst composition comprises platinum and palladium.

Typically, the DOC comprises a total amount of PGM (e.g. the total amount of platinum (Pt) and palladium (Pd)) is 15 to 400 g ft$^{-3}$. Preferably, the total amount of PGM is 20 to 300 g ft$^{-3}$, more preferably 25 to 250 g ft$^{-3}$, still more preferably, 35 to 200 g ft$^{-3}$, and even more preferably 50 to 175 g ft$^{-3}$.

When the DOC comprises platinum and palladium, then the weight ratio of Pt to Pd (in both the upstream zone and in the remainder of the diesel oxidation catalyst (DOC)) is typically 1:3 to 5:1, preferably 1:2 to 3:1, and more preferably 1:1.5 to 2:1 (e.g. 1:1.5 to 1.5:1).

Typically, the PGM concentration of the upstream zone is from 10 to 150 g ft$^{-3}$. Preferably, the PGM concentration of the upstream zone is 15 to 135 g ft$^{-3}$, more preferably 20 to 125 g ft$^{-3}$, such as 25 to 100 g ft$^{-3}$.

In a general embodiment of the invention, the upstream zone comprises platinum (Pt) and palladium (Pd). Thus, the upstream zone may comprise an upstream catalyst composition, which upstream catalyst composition comprises PGMs consisting of platinum (Pt) and (Pd). In this embodiment, platinum and palladium may be the only PGMs in the upstream zone of the DOC.

Typically, the concentration of platinum (Pt) in the upstream zone is greater than the concentration of platinum (Pt) in the remainder or downstream zone(s) of the DOC. More preferably, the concentration of palladium (Pd) in the upstream zone is less than the concentration of palladium (Pd) in the remainder or downstream zone(s) of the DOC.

When the upstream zone comprises platinum (Pt) and palladium (Pd), then typically the weight ratio of platinum (Pt) to palladium (Pd) is ≥1:1. It is preferred that the weight ratio of platinum (Pt) to palladium (Pd) is ≥1.1:1, more preferably ≥1.25:1, particularly ≥1.5:1, such as ≥1.75:1 (e.g. ≥2:1), and still more preferably ≥2.5:1 (e.g. ≥5:1). Thus, the upstream zone of the DOC comprises platinum (Pt) and palladium (Pd) in a weight ratio of 10:1 to 1:1 (e.g. 2:1 to 1.1:1 or 7.5:1 to 5:1), more preferably 8:1 to 1.25:1 (e.g. 7:1 to 1.5:1), and still more preferably 6:1 to 2.5:1.

The catalyst composition may optionally further comprise a hydrocarbon adsorbent (e.g. a zeolite) and/or one or more support materials. Hydrocarbon adsorbents are well known in the art. Examples of suitable support materials include alumina, silica-alumina, ceria, ceria-zirconia, and titania.

The DOC is conveniently, but not exclusively, based on a conventional ceramic flow through brick. There may be 100 or more, for example 400, cells per sq in.

Thus, the substrate unit or "brick" is typically a flow-through substrate unit, such as a flow-through monolith. A flow-through monolith typically comprises a honeycomb monolith (e.g. a metal or ceramic honeycomb monolith) having a plurality of channels extending therethrough, which channels are open at both ends.

Generally, the substrate unit is a ceramic material or a metallic material. It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the aftertreatment device (located downstream of the DOC) is a soot filter or a selective catalytic reduction (SCR) catalyst (e.g. a catalyst unit for selective catalytic reduction).

When the aftertreatment device is a soot filter, it is not believed that the specific type, form or construction of the soot filter is critical to the present invention, and it may be catalysed or non-catalysed.

In general, the soot filter comprises a substrate unit, which is a filtering monolith or a flow-through monolith, such as a flow-through monolith as described above. Preferably the substrate unit is a filtering monolith. The substrate unit may be coated with a catalyst composition.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the substrate unit of the soot filter is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

When the soot filter comprises a catalyst composition, then the catalyst composition may be suitable for oxidising (i) particulate matter (PM) and/or (ii) carbon monoxide (CO) and hydrocarbons (HCs). When the catalyst composition is suitable for oxidising PM, then the resulting aftertreatment device is known as a catalysed soot filter (CSF). Typically, the catalyst composition comprises platinum and/or palladium.

The aftertreatment device may be a SCR catalyst. SCR catalysts are also well known in the art.

When the catalytic aftertreatment system of the invention comprises an SCR catalyst as an aftertreatment device, then the catalytic aftertreatment system may further comprise an injector for injecting a nitrogenous reductant, such as ammonia or urea, into exhaust gas downstream of the DOC and upstream of the SCR catalyst. Alternatively or in addition to the injector, the catalytic aftertreatment system may further comprise an engine management means for enriching the exhaust gas with hydrocarbons. The SCR catalyst can then use the hydrocarbons as a reductant to reduce $NO_R$. When the substrate of the SCR catalyst is a filtering monolith, then the catalyst is an SCRF catalyst.

The means to generate a temperature increase within the aftertreatment device (e.g. by means of an active heat treatment to regenerate the device) is not critical to the present invention and may be selected from those known in the art. The means may therefore be selected from an engine management system that facilitates late fuel injection or fuel injection during an exhaust stroke, a fuel burner after a turbo, resistive heating coils and a hydrocarbon or fuel injector. The injector may be located upstream of the DOC or downstream of the DOC and upstream of the aftertreatment device. In certain embodiments, the system comprises a heater to generate a temperature increase within the aftertreatment device. The type of heater is not particularly limited provided that it is suitable for use in an exhaust gas treatment system, particularly for mobile applications, and emits heat or causes the aftertreatment device to achieve a higher temperature. Examples of heaters include those that burn fuel such as an engine management system that facilitates late fuel injection or fuel injection during an exhaust stroke, a fuel burner after a turbo; those that generate heat from electricity, such as a heater element; those that operate by convection, such as a convention heater, and the like.

An active heat treatment event may be triggered when a certain (i.e. an unacceptable) back pressure is present in the system, or may be initiated by computer means tracking engine operating conditions associated with particulate generation, sulfation or otherwise. HC additional to that already incorporated in the exhaust gas may be provided by management of fuel injection directly or indirectly into one or more cylinders, for example additional or extended fuel injection; injection post combustion, or injection into the exhaust manifold or exhaust pipework.

The catalytic aftertreatment system may further comprise a heavy duty diesel engine. The invention is suitably applied to heavy duty diesel applications, but may be applied to other engines where necessary or when advantageous.

In the case of heavy duty applications, exhaust gas temperatures at the inlet to the DOC are typically from about 225 to 275° C.

The invention further relates to a vehicle comprising a diesel engine and the catalytic aftertreatment system. The vehicle is preferably a heavy-duty diesel vehicle (HDV), such as a diesel vehicle having a gross weight of >8,500 pounds (US lbs), as defined in US legislation.

An aspect of the invention also relates to avoiding extinction of a DOC, especially during an active heat treatment event (i.e. to regenerate the aftertreatment device). The reference to avoiding extinction as used herein refers to reducing or preventing extinction. Extinction occurs when the $T_{50}$ of the DOC, usually the $T_{50}$ for hydrocarbons and/or carbon monoxide, exceeds the temperature of the DOC and typically also the temperature of the exhaust gas.

Preferably, the DOC used in the present invention is prepared by coating the entire brick with a first coating comprising a surface area enhancer such as a thermally stable high surface area alumina and a solution or suspension of the desired catalytic metal, optionally already deposited on a carrier such as alumina. A preferred method of coating is by applying a first catalytic solution using a vacuum enhanced Precision Coating (Johnson Matthey trademark) method, such as developed from the apparatus and method described in WO 99/47260. Subsequently, a second catalytic solution is applied using the same Precision Coating method, in an amount and under conditions to deposit the desired upstream zone. The downstream edge of the zone need not be straight providing that it provides a mean or minimum length of 0.5 inch. Alternative coating methods may be used, providing that these provide adequate uniform catalyst coating. Such alternatives are available to the skilled person, and may include impregnation, washcoating and chemical vapour deposition, although the preferred methods are currently thought to provide the simplest to control and most cost-effective methods.

The upstream zone is typically prepared or is obtainable by: (a) an additional precision coating step applying a second catalytic coating to a section of a brick that has already been uniformly coated with catalyst, (b) impregnation of a section of a brick that has already been uniformly coated with catalyst, (c) catalytic washcoating a section of a brick that has already been uniformly coated with catalyst, or (d) a chemical vapour deposition of one or more catalytic metals on a section of a brick that has already been uniformly coated with catalyst.

The concentration of catalytic metal used in the first and second solution may be calculated by the skilled person as necessary to provide the desired concentration or loading of catalytic metal. For example, the first solution may have a PGM concentration to yield from 10 up to 100 g/cu ft of PGM, suitably a mixture of or alloy of Pt and Pd in a weight ratio of from 1:2 to 2:1. The second solution may have a PGM concentration to yield from 10 to 150 g/cu ft of PGM, with Pt:Pd ratios from 1:3 to 5:1, for example 1:2 to 2:1.

The downstream section of the DOC is preferably, for reasons of ease and cost of manufacture, uniform in loading of catalytic metal. Nonetheless, a varied concentration, for example one or more additional catalyst "stripes" may be included without departing from the scope of the present invention.

EXAMPLES

The invention will now be illustrated by the following non-limiting examples.
Preparation of Diesel Oxidation Catalysts Three DOCs were prepared using identical bricks and all of them had an identical total PGM loading of 40 g ft$^{-3}$. Each DOC had a diameter of 10.5 inch (266.7 mm) and a length of 4 inch (101.6 mm). All of the DOCs were subjected to conventional ageing by heating at 750° C. for 12.5 hours in an oven, so that the DOCs were representative of DOCs that had been used.

DOC 1:—A conventional and commercially available diesel oxidation catalyst was prepared (DOC 1), which had a uniform loading of Pt:Pd in a ratio of 7:6.

DOC 2:—A diesel oxidation catalyst (DOC 2) having a uniform loading of about 40 g ft$^{-3}$ but with a 10 mm "stripe" of higher PGM concentration was prepared. DOC 2 was prepared by dipping a DOC with its first coating into an additional catalyst slurry/solution at Pt:Pd ratio of 1:1 to yield a high concentration stripe at 100 g ft$^{-3}$.

DOC 3:—A diesel oxidation catalyst (DOC 3) having a uniform coating of about 40 g ft$^{-3}$ and a zone of 1 inch (25.4 mm) in depth with a higher PGM loading of 100 g ft$^{-3}$ at a Pt:Pd ratio of 1:1 was prepared using the method described for DOC 2.
Test Method A thermal analysis of each of the diesel oxidation catalyst was performed by passing an exhaust gas from a diesel engine fuelled with EUV B7 fuel (7% Bio fuel) for both engine operation and enrichment, running at 2200 rpm. The engine was a 7 liter capacity EUVI 6 cylinder engine, producing 235 kW at 2500 rpm, fitted with a 7$^{th}$ injector positioned in the exhaust piping upstream of the DOC.

Thermocouples were inserted along the centre line of the DOC brick, at depths measured from the upstream face of 7.6 mm (T1), 25.6 mm (T5) and 94.6 mm (T9). T5 is therefore at the beginning of the downstream zone, although it is later described as in a "middle" position. After 1700 seconds or 1800 seconds on stream, the exhaust gas was enriched to represent an HC-enriched gas at 250° C. during a filter regeneration event, and was passed through the DOC.
Results The results are shown in FIGS. 1 to 3, which are plots of temperature with time in seconds for each of the tested DOCs.

FIG. 1 demonstrates that there is only a small exotherm at the front of a conventional DOC (DOC 1). There is a slightly larger exotherm in the "middle" position and, although a peak temperature of 450° C. is reached, this is for a short time only. The initial light off is extinguished completely at 2100 seconds.

Figure 2:
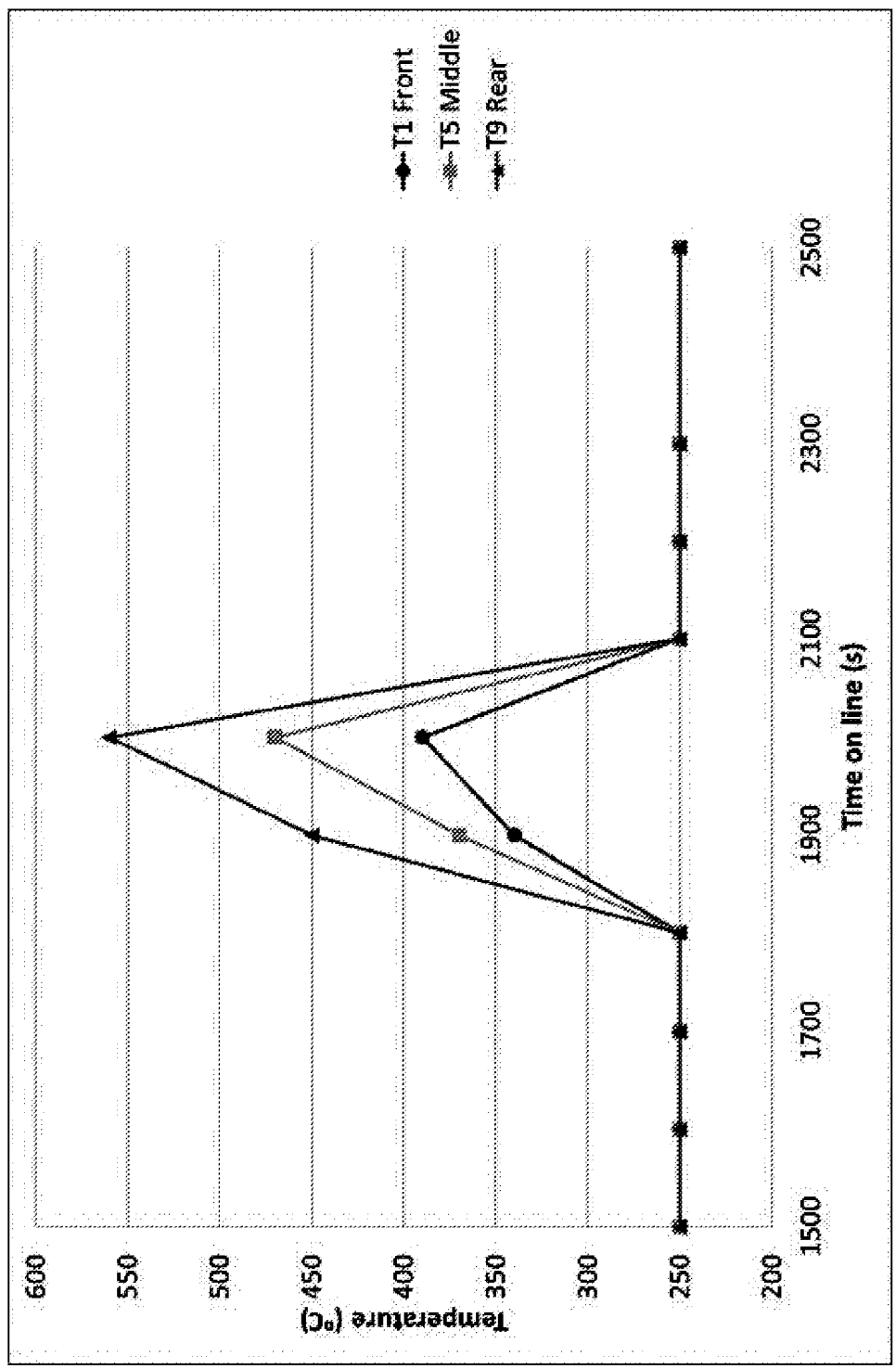
FIG. 2 is a graph showing the temperature at three regions inside a diesel oxidation catalyst having a 10 mm "stripe" of higher PGM concentration (DOC 2) when an exhaust gas is passed through it.

The results for DOC 2 are shown in FIG. 2. When enrichment is initiated at 1800 seconds, peak temperatures at all positions are higher than with DOC 1. However, it is clear that light off does not persist, and the exotherm is again totally extinguished at 2100 seconds.

Figure 3:
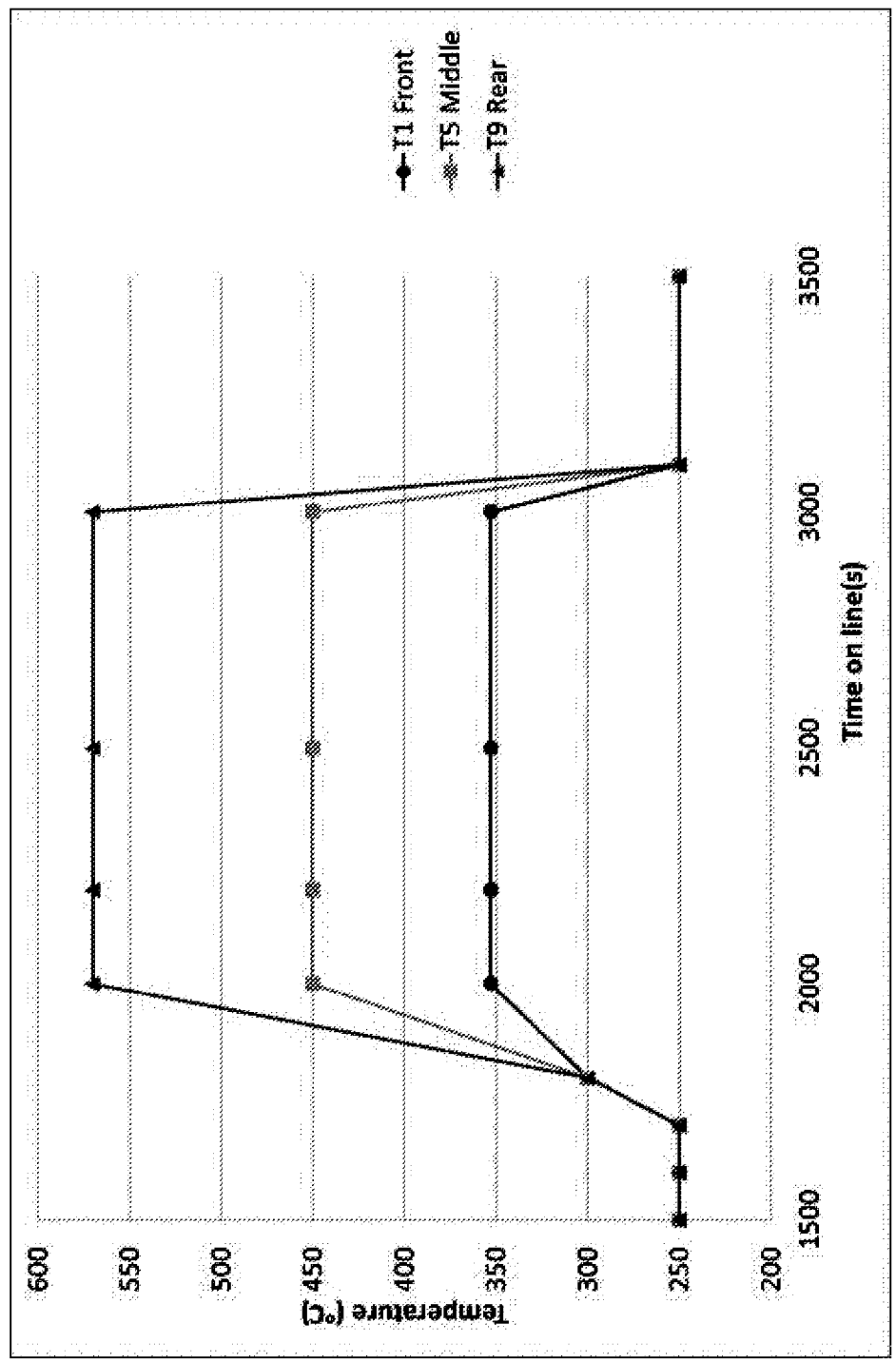
FIG. 3 is a graph showing the temperature at three regions inside a diesel oxidation catalyst in accordance with the invention (DOC 3) when an exhaust gas is passed through it.
Figure 4:
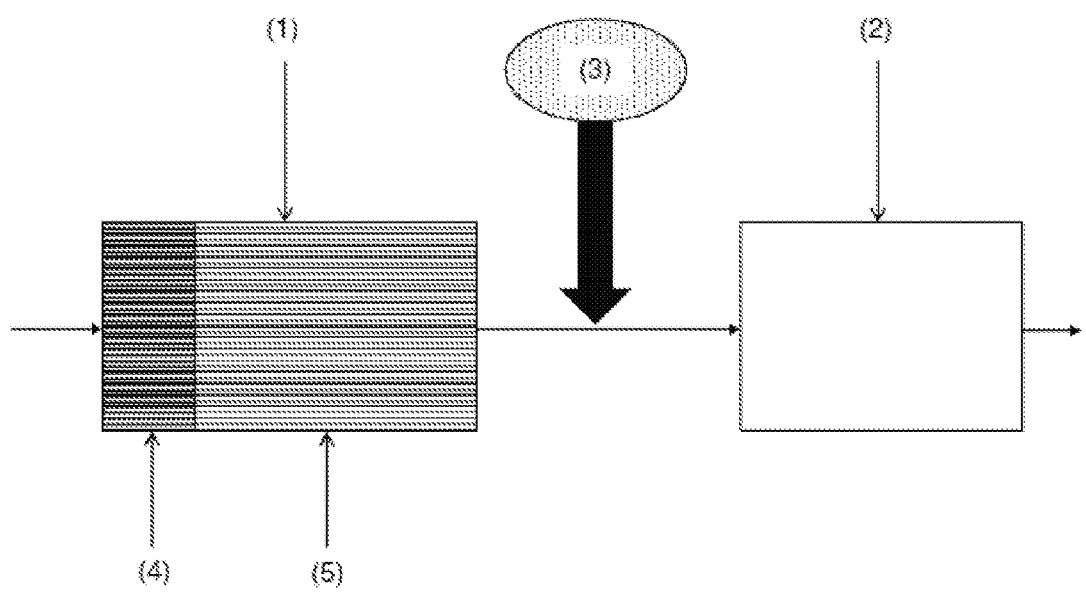
FIG. 4 is a diagram showing a catalytic aftertreatment system in accordance with the invention. An aftertreatment device (2) is located downstream a diesel oxidation catalyst (1). The diagram shows a cross-section through the substrate unit of the diesel oxidation catalyst (1). A catalyst composition is coated on the substrate unit, which has an upstream zone (4) and a remainder (5). The aftertreatment system also comprises a means to generate a temperature increase within the aftertreatment device (3), which in the diagram is a hydrocarbon injector.

The results for DOC 3 are shown in FIG. 3. When enrichment is started at 1700 seconds, the temperature plots for all of the thermocouple positions are very different compared to the results for DOC 1 and DOC 2. The temperatures were found to initially climb strongly, and then stable temperatures were achieved at all of the thermocouple positions by 2000 seconds. The temperatures were maintained until enrichment was terminated at 3000 seconds.

These tests clearly show the benefit of the invention under the test conditions. In the case of heavy duty applications, exhaust gas temperatures at the inlet to the DOC are typically from about 225 to 275° C.

Additionally, tests were carried out to detect HC in the exit gases from each DOC. Perhaps unsurprisingly in view of the tests described above, HC slip is detected at high levels after extinction of light off for both DOC 1 and DOC 2, whereas for DOC 3 HC is effectively removed whilst at the same time generating the desired exotherm, adequate for filter regeneration.

For the avoidance of any doubt, the entire content of any and all documents cited herein is incorporated by reference into the present application.

The invention claimed is:

1. A catalytic aftertreatment system for a diesel engine exhaust gas, said system comprising a diesel oxidation catalyst (DOC) and an aftertreatment device located downstream of the diesel oxidation catalyst (DOC), which aftertreatment device requires periodic heat treatment, and means to generate a temperature increase within the aftertreatment device, said diesel oxidation catalyst (DOC) having a diameter of from 4 to 15 inches and a length of from 2.5 to 10 inches, said diesel oxidation catalyst (DOC) comprising:
- a catalyst composition supported on a substrate unit, wherein the catalyst composition comprises platinum, palladium and one or more support materials selected from the group consisting of alumina, silica, alumina, cerium, ceria-zirconia and titania and does not include a hydrocarbon adsorbent;
- an upstream zone of the catalyst composition and a remainder;
- wherein the upstream zone has a concentration of platinum (Pt) that is greater than the concentration of platinum (Pt) in the remainder; and
- wherein the upstream zone has a length of 0.5 to 1.5 inches (12.7-38.1 mm), and is of higher oxidation activity for hydrocarbons (HC) than the remainder; and
- the weight ratio of platinum (Pt) to palladium (Pd) in the remainder is 1:3 to 5:1.

2. The catalytic aftertreatment system according to claim 1 wherein the diesel oxidation catalyst comprises a mixture of platinum (Pt) and palladium (Pd), or an alloy of platinum (Pt) and palladium (Pd).

3. The catalytic aftertreatment system according to claim 1, wherein the platinum group metal (PGM) concentration of the upstream zone is from 10 to 150 g ft$^{-3}$.

4. The catalytic aftertreatment system according to claim 1, wherein the aftertreatment device is a soot filter.

5. The catalytic aftertreatment system according to claim 1, wherein the aftertreatment device is a catalyst unit for selective catalytic reduction (SCR).

6. The catalytic aftertreatment system according to claim 1, further comprising a heavy duty diesel engine.

7. The catalytic aftertreatment system according to claim 1, wherein the concentration of palladium (Pd) in the upstream zone is less than the concentration of palladium (Pd) in the remainder.

8. The catalytic aftertreatment system according to claim 1, wherein the remainder of the diesel oxidation catalyst (DOC) comprises a plurality of zones.

9. The catalytic aftertreatment system according to claim 1, wherein the remainder of the diesel oxidation catalyst (DOC) comprises a plurality of layers.

10. A vehicle comprising a diesel engine and a catalytic aftertreatment system according to claim 1.

* * * * *